No. 732,474. Patented June 30, 1903.

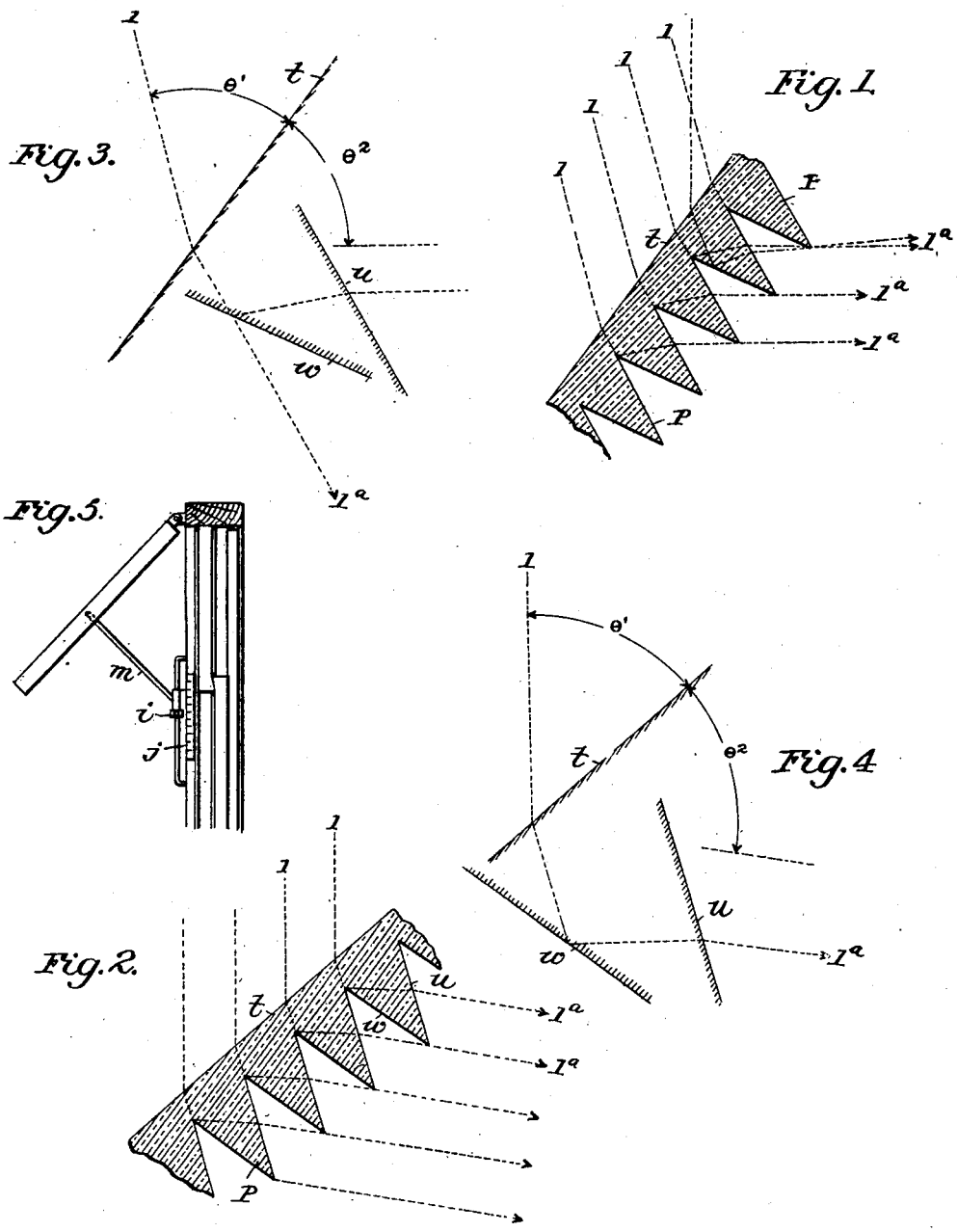

UNITED STATES PATENT OFFICE.

FRANK L. O. WADSWORTH, OF WILLIAMS BAY, WISCONSIN, ASSIGNOR, BY MESNE ASSIGNMENTS, TO PRESSED PRISM PLATE GLASS COMPANY, A CORPORATION OF WEST VIRGINIA.

ILLUMINATING-CANOPY.

SPECIFICATION forming part of Letters Patent No. 732,474, dated June 30, 1903.

Application filed April 7, 1898. Serial No. 676,823. (No model.)

*To all whom it may concern:*

Be it known that I, FRANK L. O. WADSWORTH, a citizen of the United States, residing at Williams Bay, in the county of Walworth and State of Wisconsin, have invented certain new and useful Improvements in Illuminating-Canopies, of which the following is a specification.

My invention relates to illuminating structures; and it consists in a construction and arrangement fully set forth hereinafter and illustrated in the accompanying drawings, in which—

Figure 1 is a side view of a section of a transparent illuminating-panel illustrating my improvement; Fig. 2, the same designed to meet somewhat different conditions. Fig. 3 is a diagram illustrating the geometric means of determining the proper angle of inclination of the receiving-face of the panel or structure and the form of the deflecting elements when the light is falling upon them in a given direction; Fig. 4, the same as Fig. 3, the light falling vertically; Fig. 5, the structure as in place outside of a window or other vertical opening.

The improved structure is intended for use especially as a canopy outside of the window in a wall, well, area, or other place where the main proportion of entrance rays available for producing an increased illuminating effect come from one direction—as, for instance, the opening toward the sky in a narrow street, area, or light-shaft.

The structure consists of a series of prisms P P, which may be separate prism-bars arranged side by side or united in one panel; but in either case the entrance-face $t$ is a plain flat surface which in most cases will form part of the continuous surface of a prism-plate, as in Figs. 1 and 2. The prism-faces $u$ $w$ on the opposite or inner side of the structure are at an acute angle to each other, preferably arranged so that the face $u$ is parallel to the plane of refraction of the principal incident rays 1 on the face $t$, and the face $w$ makes equal angles with this plane and with the plane of refraction of the emergent rays as traced back through the face $u$.

One of the greatest difficulties in the use of prism-plates in canopies heretofore has been to secure the transmission and deviation of the entire body of incident light through the prism-plate in the desired direction without its being diverted or broken up by reason of the interference of each prism with the one just below. A number of complicated prism forms have been designed and used to avoid the difficulty, but these forms have not only been very expensive to make, but have been inefficient in that they send a portion of the light in other than the desired direction. I have discovered in connection with my work in this class of structures that this interference can be completely avoided for all deviations of the light of less than a right angle and all the advantages of the simple prism forms retained by first designing the prism forms as above set forth, and, second, by placing the plane of the entrance-face $t$ of the illuminating structure parallel to a plane bisecting the angle between the principal incident rays (those which come from the main source of illumination and which it is therefore most necessary to transmit in the desired direction without any breaking up or loss) and the principal emergent rays (in other words, the angle of deviation or deflection of these rays by the prisms) on the other side of the structure. Thus, as shown in Figs. 1 and 2, which illustrate two cases in which the direction of the principal incident rays 1 1 are different, the extreme rays from the upper side of any prism will just clear the point of the prism above, and the entire body of rays will thus be transmitted in the desired direction $1^a$ $1^a$ without loss or breaking up, such as would occur if any of the rays emerging from one prism struck the points of prisms above or below. It will be evident from an inspection of Figs. 1 and 2, in which the course of the principal incident rays 1 1 through the structure are accurately mapped out, that this result can only be secured by making the angle between the principal incident rays 1 1 and the receiving-face equal to or less than the angle between this same face and the principal emergent rays $1^a$ $1^a$. The result can be secured by making the angle $\theta'$ less than the angle $\theta^2$, but only at a sacrifice of available canopy area (for windows or openings of given vertical height, which height of course fixes the width of the emergent beam) and at a sacrifice of some additional light lost by reflection at the incident face $t$, the loss by reflection increasing as the angle between the face and the incident rays decreases—i. e., as the angle of incidence increases. The principal features of my invention and those which I desire to secure by Letters Patent, therefore, consist in the discovery of the condition of maximum efficiency in the action of the canopy in collecting and transmitting the maximum quantity of light in a given direction through an opening of a given size without loss or breaking up.

The prism structure is arranged for use within a frame A, and when the structure is applied to a window, as in Fig. 5, the frame is so arranged that the face $t$ may be placed at the proper angle, as determined above, to the entrance rays, when it will be found that the full body of light falling from the principal direction on the face $t$ is transmitted without loss or breaking up into the body of the room in the desired and predetermined direction.

The canopy can be made adjustable, if desired, so as to be moved to one side or the other of the position of maximum efficiency; but in this case an index or fixed stop or other means should be provided on some part of the structure—as, for example, the mark $i$ on the bar $k$—which will indicate definitely the proper angle in which it should be placed in order to secure the full transmission of the principal incident rays, as determined in the manner set forth above.

It may happen that the direction of the principal incident rays will change during the day or at different times during the year, in which case I provide any suitable means for indicating the proper position of the canopy at different times—such, for example, as a fixed graduated scale $j$ on the wall of the building opposite to an index on the moving arm $m$ of the canopy-support.

Without limiting myself to the precise construction shown, I claim—

An illuminating-canopy consisting of a prism-plate with a series of prisms on the lower side having two plane faces $u$ $w$ meeting at an acute angle, one face $u$ of each prism parallel to the plane of refraction of the principal incident rays, and the other face $w$ making equal angles with the face $u$ and the plane of refraction of the emergent rays traced back through the face $u$, and with a plane receiving-face $t$ parallel to a plane bisecting the angle of deflection of the principal incident rays, substantially as described.

In testimony whereof I have signed my name to this specification in the presence of two subscribing witnesses.

FRANK L. O. WADSWORTH.

Witnesses:
HARRY E. HAY,
W. CLARENCE DUVALL.